C. A. RUSSELL.
TIRE CASE.
APPLICATION FILED APR. 14, 1909.
959,391.
Patented May 24, 1910.
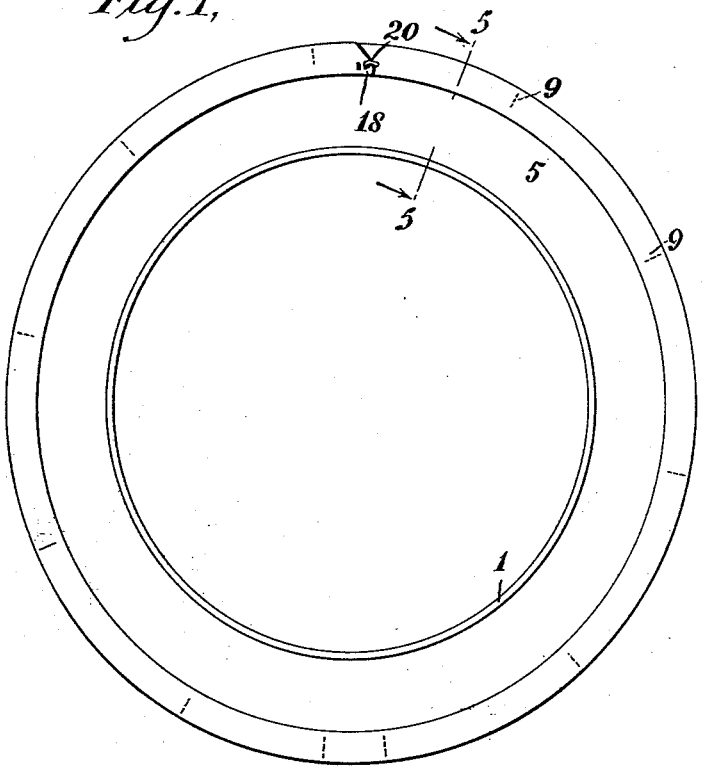
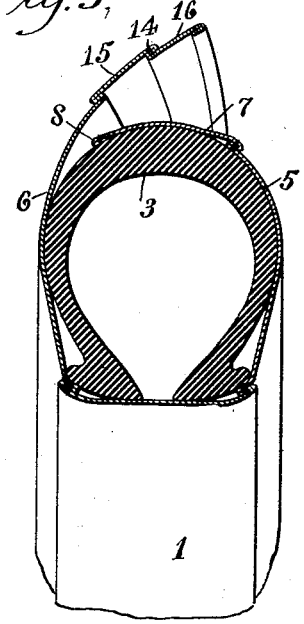
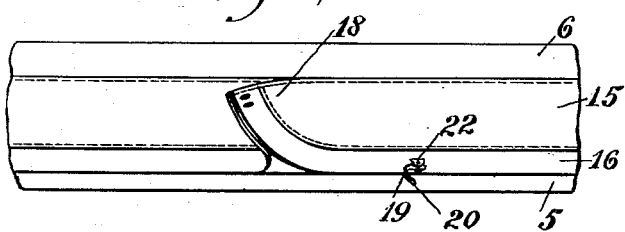
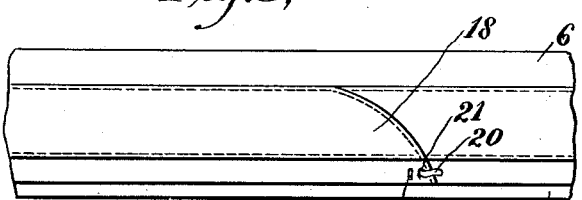
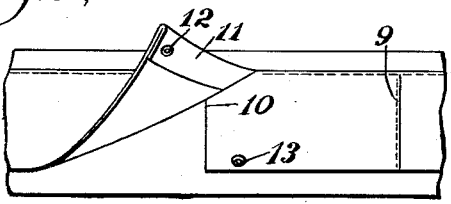
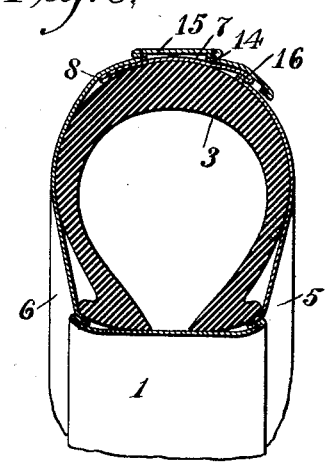
WITNESSES
Edw. Thorpe.
F. D. Ammen
INVENTOR
Charles A. Russell.
BY Munn & Co
ATTORNEYS

UNITED STATES PATENT OFFICE.

CHARLES A. RUSSELL, OF NEW YORK, N. Y.

TIRE-CASE.

959,391.  Specification of Letters Patent.  Patented May 24, 1910.

Application filed April 14, 1909. Serial No. 489,811.

*To all whom it may concern:*

Be it known that I, CHARLES A. RUSSELL, a citizen of the United States, and a resident of the city of New York, borough of Manhattan, in the county and State of New York, have invented a new and Improved Tire-Case, of which the following is a full, clear, and exact description.

This invention relates to tire cases or covers such as used for enveloping automobile tires, or the tires of similar vehicles so that they will be protected from the weather. Such covers are used especially on extra or spare tires which are carried usually in an exposed position somewhere about the body of the vehicle.

The object of the invention is to produce a tire case of this class which will be devoid of metal parts in its inner construction, but which will have a form which will enable it to be readily placed in position upon the tire, and so that it will fit neatly to the curvature of the tire which it envelops.

The invention consists in the construction and combination of parts to be described more fully hereinafter and particularly set forth in the claims.

Reference is to be had to the accompanying drawings forming a part of this specification, in which similar characters of reference indicate corresponding parts in all the figures.

Figure 1 is a side elevation of a tire case constructed according to my invention and containing a spare tire; Fig. 2 is a plan of the tire case showing an outside folding flap or fastening flap in perspective. Fig. 3 is a view similar to Fig. 2, but showing the flap fastened; Fig. 4 is a plan of the inner lap of one of the outer strips and showing its folding flap in perspective; Fig. 5 is a cross section taken through the tire and showing the case in the act of being applied thereto; Fig. 6 is a view similar to Fig. 5 but showing the case applied and secured in position so as to form a complete envelope for the tire; and Fig. 7 is a detail plan showing a portion of one edge and showing a gore seam which gives a desired crimp or construction to the free edge of the said strip.

Referring more particularly to the parts, and especially to Fig. 5, the tire case is formed of an inner web strip 1 which is in the form of a ring fitting against the inner face of the tire 3. This web 1 is made of an endless piece so that the web strip forms a circle or ring fitting the inner diameter of the tire, as shown. To the edges of this web strip, endless annular side strips 5 and 6 are attached, as shown. The side strip 5 has attached thereto a strip 7, and the free edge 8 of this strip is provided with gore seams 9, as indicated in Figs. 4 and 7. They are formed by removing a small triangular piece and bringing the edges together to fill the gap so formed. These gore seams have the effect of producing a slight crimp or constriction in the edges of the strips in which they are applied, and at a suitable point this edge is provided with a slit or opening 10. At this point a flap 11 is provided, formed by the overlapping outside edge, and this flap is provided with a fastener socket 12 which is adapted to engage a contractible fastener button 13 which is on the inner lap. This socket and button constitute a releasable clasp.

To the edge of the side strip 6 which is remote from the web strip 1, an outer strip 14 is attached, and this outer strip is composed of a crown strip 15 which is attached directly to the side strip 6; to the other edge of the crown strip a keeper strip or keeper 16 is attached.

As indicated in Fig. 2, the ends of the outer strip are secured together so as to form a flap 18 of a double thickness of material. This flap gives an abundance of material in the outer strip and increases the facility with which it is brought into position when the case is being placed upon the tire. When this is done the flap 18 will fit neatly down upon the outer strip, as indicated in Fig. 3. In order to hold it in this position, I employ a clasp 19 which is attached near the free edge of the outer strip, as shown in Figs. 2 and 3. This fastener simply presents a tongue 20 having a bight or bow 21 at its root, at which point it is attached by means of a pivot pin 22. When unfastened, the tongue 20 will project out from the case and substantially at right angles to the plane of the strip. In the adjacent part of the flap 18 I provide a plurality of eyelets 23, any one of which may be engaged by the tongue, as indicated. In this way the flap 18 will fold down neatly upon the outer strip and as the tension device brings it into position, the slack existing in the flap 18 and in the outer strip is taken up. In order to make the free edge of the outer strip 14 of such construction so as to fit the curvature of the tire it is built up of sections cut on a curve. This will make the free edge tend to assume a smaller diameter than the body of the strip.

In applying the case to a tire, the fastener socket 12 of the edge 7 is released from the button 13 and this edge is then slipped over the tread of the tire from the right-hand side, as viewed in Fig. 5. The fastening device 12 and 13 is then closed, thereby holding the edge 7 in position on the tire. The case is applied to the tire by wrapping it laterally upon the tire. The other edge strip and the side strip 6 of the case are passed through the central opening of the tire so as to bring the side strip 5 into position and so as to bring the web strip 1 into the central opening of the tire. The fastening device 19 on the edge strip 16 being released, said edge strip 16 is then pulled over the tread of the tire so as to overlie the other edge strip 7. After the edge strip 16 has been brought into position in this manner the flap 18 is brought into position and secured to the fastening 19, as described above.

It should be understood that when the body of the case is passed through the central opening of the tire it can be pulled tightly so that the side strip 5 will be stretched tight on the side of the tire. In this connection it should be understood that the crimped or constricted edge 8 of the strip 7 is of sufficiently small diameter to prevent its passing over the greater diameter of the tire at the tread. When the tire case has been placed in position it will be noted that the crimped or constricted edge 9 lies on one side of the central plane of the tire, while the edge strip 16 lies on the other side of the central plane of the tire. Inasmuch as the edge strip 16 must have some tension exerted upon it in bringing it into position, it should be understood that when it is secured it will hold itself in position so that all the strips of the tire case are stretched nicely and maintained in this condition.

A tire case constructed as described fits very neatly to the tire and can be readily applied in position. It does not embody in its construction tension rings or similar devices which have heretofore been used in the seams of tire cases. As these tire cases are exposed to the weather, this is an advantageous feature of the invention.

The fullness of material or double flap 18, together with its fastening device, constitutes a cast-off or outlet for increasing the diameter of the tire case at the edge where it is located. Similarly the slit 10 together with its fastening device may be considered as a cast-off or outlet for increasing the diameter of the opposite edge of the tire case when passing the same over the greater diameter of the tire tread.

Having thus described my invention, I claim as new and desire to secure by Letters Patent,—

1. A tire case composed of an endless inner web strip, endless side strips secured to the edges of said web strip, an outside strip secured to the outer edge of one of said side strips, said outside strip having gore seams and a slit provided with a fastening device, a crown strip secured to the outer edge of the other side strip, and a crimped strip secured to the outer edge of said crown strip, said crown strip and said crimped strip having a folding flap provided with a fastening device.

2. A tire case having an endless inner web strip, endless side strips attached thereto, outside strips forming the edges of the case attached to the free edges of said side strips, one of said outside edges being formed and provided with means whereby when the edge of the case is in position on the tire it is securely held in position, and the other edge being formed of a strip having gore seams and a slit, and a fastening device by means of which said edge of the case is held securely in position on the tire.

3. A tire case adapted to be wrapped laterally around the tire, comprising an outside edge strip adapted to lie against the tire tread having a constricted diameter preventing said strip from passing over the greatest diameter of the tread, endless annular strips attached to said outside edge strip and adapted to cover the sides and the inner face of the tire, and a second outside edge strip lying on the tire tread over said first outside edge strip, the diameter of said case at said second outside edge strip being less than the diameter of the tire over the tread and lying on the opposite side of the middle plane of the tire opposite to said first outside edge strip, said second outside edge strip having an outlet with overlapping layers of material and a releasable clasp permitting said strip to pass over the greatest diameter of said tire.

4. A tire case adapted to be wrapped laterally around the tire, comprising an outside edge strip adapted to lie against the tire tread having a constricted diameter preventing said strip from passing over the greatest diameter of the tread, endless annular strips attached to said outside edge strip and adapted to cover the sides and the inner face of the tire, and a second outside edge strip lying on the tire tread over said first outside edge strip, the diameter of said case at said second outside edge strip being less than the diameter of the tire over the tread and lying on the opposite side of the middle plane of the tire opposite to said first outside edge strip, said second outside edge strip having an outlet with normally overlapping layers and a releasable clasp permitting the same to pass over the greatest diameter of said tire, said first named outside edge strip also having an outlet in the edge thereof with normally overlapping layers and a releasable clasp permitting said first-named outside strip to be passed over the greatest diameter of the tire.

In testimony whereof I have signed my name to this specification in the presence of two subscribing witnesses.

CHARLES A. RUSSELL.

Witnesses:
F. D. AMMEN,
PHILIP D. ROLLHAUS.